United States Patent
Park et al.

(10) Patent No.: US 11,081,750 B2
(45) Date of Patent: *Aug. 3, 2021

(54) POUCH TYPE CASE AND BATTERY PACK INCLUDING THE SAME

(71) Applicant: LG Chem, Ltd., Seoul (KR)

(72) Inventors: Hyo Seok Park, Daejeon (KR); Young Joon Shin, Daejeon (KR); Hyun Woo Park, Daejeon (KR)

(73) Assignee: LG Chem, Ltd.

( * ) Notice: Subject to any disclaimer, the term of this patent is extended or adjusted under 35 U.S.C. 154(b) by 0 days.

This patent is subject to a terminal disclaimer.

(21) Appl. No.: 13/845,829

(22) Filed: Mar. 18, 2013

(65) Prior Publication Data

US 2013/0216880 A1 Aug. 22, 2013

Related U.S. Application Data

(63) Continuation of application No. 13/186,849, filed on Jul. 20, 2011, now Pat. No. 8,426,057, which is a (Continued)

(30) Foreign Application Priority Data

Mar. 19, 2010 (KR) .......................... 10-2010-0024879

(51) Int. Cl.
*H01M 50/148* (2021.01)
*H01M 10/04* (2006.01)
(Continued)

(52) U.S. Cl.
CPC ....... *H01M 50/148* (2021.01); *H01M 10/045* (2013.01); *H01M 10/0413* (2013.01);
(Continued)

(58) Field of Classification Search
CPC ........................... H01M 2/021; H01M 2/0212
(Continued)

(56) References Cited

U.S. PATENT DOCUMENTS

| 6,673,488 B2 | 1/2004 | Furusaki |
| 7,029,789 B2 | 4/2006 | Kaneta |
| 7,122,271 B2 | 10/2006 | Kim et al. |
| 8,426,057 B2* | 4/2013 | Park et al. ................. 429/159 |

(Continued)

FOREIGN PATENT DOCUMENTS

| CN | 101454925 A | 6/2009 |
| EP | 1524709 A2 | 4/2005 |

(Continued)

OTHER PUBLICATIONS

Supplementary European Search Report, EP 11756595, dated Dec. 10, 2013.

*Primary Examiner* — Barbara L Gilliam
*Assistant Examiner* — Helen M McDermott
(74) *Attorney, Agent, or Firm* — Lerner, David, Littenberg, Krumholz & Mentlik, LLP

(57) ABSTRACT

The present invention relates to a pouch type case having trimming portions formed on both sides or four corners thereof and a battery pack including the same. The trimming portions are formed on the corners of the pouch type case such that the trimming portions are indented toward an electrode assembly accommodating part to reduce a unit area so as to increase pressure applied to unit cells when a battery pack is assembled, thereby facilitating assembling of the battery pack and increasing cell capacity per unit area. Furthermore, the unit cells can be fixed in the battery pack more stably. The pouch type case reduces the unit area so as to include a relatively large number of cells for pressure applied to the cells when the battery pack is assembled to thereby increase the cell capacity.

14 Claims, 13 Drawing Sheets

Related U.S. Application Data continuation of application No. PCT/KR2011/001927, filed on Mar. 21, 2011.

(51) Int. Cl.
| | |
|---|---|
| *H01M 10/052* | (2010.01) |
| *H01M 50/178* | (2021.01) |
| *H01M 50/105* | (2021.01) |
| *H01M 10/0583* | (2010.01) |
| *H01M 10/0587* | (2010.01) |
| *H01M 50/463* | (2021.01) |
| *H01M 50/578* | (2021.01) |
| *H01M 50/557* | (2021.01) |
| *H01M 50/30* | (2021.01) |

(52) U.S. Cl.
CPC ..... *H01M 10/0459* (2013.01); *H01M 10/052* (2013.01); *H01M 10/0583* (2013.01); *H01M 10/0587* (2013.01); *H01M 50/105* (2021.01); *H01M 50/178* (2021.01); *H01M 50/463* (2021.01); *H01M 50/557* (2021.01); *H01M 50/578* (2021.01); *H01M 50/30* (2021.01); *H01M 2200/20* (2013.01); *H01M 2220/20* (2013.01); *Y02E 60/10* (2013.01); *Y02T 10/70* (2013.01)

(58) Field of Classification Search
USPC ....... 429/159, 175, 156, 162, 178–181, 184, 429/185
See application file for complete search history.

(56) References Cited

U.S. PATENT DOCUMENTS

| | | |
|---|---|---|
| 2003/0017388 A1 | 1/2003 | Furusaki |
| 2003/0146734 A1* | 8/2003 | Kozu ................... H01M 2/021 320/107 |
| 2004/0048149 A1 | 3/2004 | Gross et al. |
| 2005/0079757 A1 | 4/2005 | Watanabe |
| 2005/0191549 A1 | 9/2005 | Kang et al. |
| 2006/0051658 A1* | 3/2006 | Otohata ................ H01M 2/021 429/53 |
| 2006/0210872 A1* | 9/2006 | Yageta et al. ................. 429/185 |
| 2006/0269840 A1 | 11/2006 | Oogami et al. |
| 2007/0231683 A1* | 10/2007 | Lee etal. ........................ 429/161 |
| 2008/0138698 A1* | 6/2008 | Ogami ............... H01M 2/1061 429/91 |
| 2010/0047685 A1 | 2/2010 | Lee et al. |
| 2010/0055558 A1 | 3/2010 | Choi et al. |
| 2011/0064991 A1* | 3/2011 | Ahn ............................ 429/153 |

FOREIGN PATENT DOCUMENTS

| | | | |
|---|---|---|---|
| JP | 2001-273930 A | 10/2001 | |
| JP | 2002056835 A | 2/2002 | |
| JP | 2005038613 A | 2/2005 | |
| JP | 2007-134233 A | 5/2007 | |
| JP | 2007265738 A | 10/2007 | |
| JP | 2008186750 A * | 8/2008 | |
| KR | 20040022713 A | 3/2004 | |
| KR | 1020050121896 A | 12/2005 | |
| KR | 20070099068 A | 10/2007 | |
| KR | 1020070098399 A | 10/2007 | |
| KR | 1020080017264 A | 2/2008 | |
| KR | 1020090016279 A | 2/2009 | |
| WO | WO 2008023903 A1 * | 2/2008 | ............ H01M 2/021 |

* cited by examiner (PRIOR ART)

(PRIOR ART)

(PRIOR ART)

(PRIOR ART)

POUCH TYPE CASE AND BATTERY PACK INCLUDING THE SAME

CROSS-REFERENCE TO RELATED APPLICATIONS

This application is a continuation of U.S. application Ser. No. 13/186,849, filed Jul. 20, 2011, which is a continuation of International Application No. PCT/KR2011/001927 filed on Mar. 21, 2011, which claims priority from Korean Patent Application No. 10-2010-0024879 filed in Republic of Korea on Mar. 19, 2010, the entire contents of which are incorporated herein by reference.

TECHNICAL FIELD

The present invention relates to a pouch type case and a battery pack including the same.

BACKGROUND OF THE INVENTION

With the development of portable electrode devices such as cellular phones, notebook computers, and camcorders, studies on rechargeable secondary batteries are actively performed. Particularly, the lithium secondary battery operating at a voltage of approximately 3.6V has capacity more than three times that of nickel-cadmium battery or nickel-metal hydride battery, which is widely used as a power supply of portable electronic devices, and high energy density per unit weight, and thus utilization and study of the lithium secondary battery become rapidly activated.

The lithium secondary battery can be classified into a liquid electrolyte battery and a polymer electrolyte battery according to electrolyte type. Generally, a battery using a liquid electrolyte is referred to as lithium ion battery and a battery using a polymer electrolyte is referred to as a lithium polymer battery. The lithium secondary battery can be manufactured in various forms, typically, in cylindrical and square shapes. The lithium polymer battery, which is currently spotlighted, is manufactured in a deformable pouch shape such that its shape is freely changed. In addition, the lithium polymer battery is advantageous to reduce the thicknesses and weights of portable electronic devices since it light and has highs stability.

Recently, capacity increase and stability of the lithium secondary battery become important issues as the lithium secondary battery is used as a power supply of electric vehicles as well as various electrode devices and studies on the capacity increase and stability of the lithium secondary battery are actively performed.

To increase the capacity of the lithium secondary battery, unit cells manufactured in a pouch type are stacked and electrically connected to assemble a battery pack to thereby provide a lithium secondary battery having required capacity. The size of the battery pack cannot be limitlessly increased and light, compact and high-capacity battery packs are required.

Furthermore, since a battery pack having a specific unit area has electrically connected unit battery cells, the battery pack may explode if one of the unit battery cells is heated or short-circuited. This increases a demand for battery packs having improved stability.

The shape of a unit battery cell 10 included in a conventional battery pack is illustrated in FIG. 1.

Referring to FIG. 1, the unit battery cell 10 includes an electrode assembly 30 and a case 20 providing a space for accommodating the electrode assembly 30. The electrode assembly 30 is composed of a positive plate, a negative plate and a separated interposed between the positive plate and the negative plate. The electrode assembly 30 is wound into a shape of jelly-roll type with the positive plate, the separator and the negative plate sequentially arranged or composed of multiple electrodes laminated in a stack structure.

Furthermore, the electrode assembly 30 includes a cathode lead 60 and an anode lead 70 electrically connected to each pole plate and exposed to the outside of the sealed case 20. The case 20 is of pouch type that is composed of a thin metal film and an insulating film bonded to both sides of the thin metal film and can be freely bent, distinguished from a cylindrical or square type case formed from a thick metal plate, to thereby accomplish compact electronic devices.

FIG. 2 is a partial enlarged view showing the top portion of the inside of the case 20 of the secondary battery shown in FIG. 1, where cathode taps 40 are combined in a concentrated manner and connected to the cathode lead 60. FIG. 3 is a plan view of the secondary battery in an assembled state, shown in FIG. 1. Referring to FIGS. 2 and 3, the cathode taps 40 extended from a cathode current collector 41 and projected are combined by welding, for example, and connected to the cathode lead 60 in the form of a welded portion. The cathode taps 40 of the welded portion are bent in an approximately V shape, and thus a connecting portion of electrode taps and an electrode lead can be referred to as a V-forming part. The cathode lead 60 is sealed by the battery case 20 with the end 61, to which the cathode tap welded portion is connected, exposed to the outside of the case 20.

Since the cathode taps 40 are combined to form the welded portion, as described above, the top end of the inside of the battery case 20 is spaced apart from the top end (or bottom end) of the electrode assembly 30 by a predetermined distance. Accordingly, the distance $L_1$ between the top end (or bottom end) of the electrode assembly 30 and the insulating film is considerably long and a dead space irrespective of battery capacity is generated around the welded portion of the cathode taps and the cathode lead. In addition, if gas is generated in the battery pack, the generated gas can easily remain in the dead space.

The conventional pouch type secondary battery is inefficient since many dead spaces are generated in the battery due to its structure and, even when external pressure applied to the secondary battery is increased to restrain generation of gas, it is difficult to restrain the generation of gas because a space where gas can remain exists inside the battery.

SUMMARY OF THE INVENTION

Accordingly, an aspect of the present invention is to solve the above problems using a pouch type case capable of reducing an internal dead space and provide a pouch type case for lithium secondary batteries, which can maximize space utilization when a battery pack structure requiring holders is designed.

Another aspect of the present invention is to provide a battery pack including the pouch type secondary battery having the above structure, in which unit cells can be stacked more stably.

There is provided a pouch type case having a space accommodating an electrode assembly composed of a positive plate, a negative plate and a separator interposed between the positive plate and the negative plate and a sealing part sealing up an upper case and a lower case, wherein a portion of the space and sealing part, which corresponds to at least one of the left and right sides of an electrode lead projected to the outside of the case, includes a trimming portion intended toward the electrode assembly.

The trimming portion may be spaced apart from the electrode lead and the top end of the electrode assembly by a distance corresponding to the width of the sealing part.

The trimming portion may be spaced apart from the electrode lead by longer than 6 mm and shorter than the width of the electrode lead and spaced apart from the top end of the electrode assembly by longer than 3 mm and shorter than the length of the electrode lead.

The trimming portion may have one of circular, oval, straight-line, rectangular, triangular, parabola and V shapes.

The pouch type case may include trimming portions respectively formed on the corners of the case and the trimming portions have the same shape or different shapes.

The electrode assembly may have an anode lead and a cathode lead projected in different directions.

The anode lead and the cathode lead may be projected from one of a shorter side and a longer side of the electrode assembly.

Portions of the space and the sealing part, which correspond to the left and right sides of the anode lead and the cathode lead, may respectively include trimming portions indented toward the electrode assembly.

The electrode assembly may have an anode lead and a cathode lead projected in the same direction.

The direction in which the anode lead and the cathode lead are projected may correspond to one of the shorter side and longer side of the electrode assembly.

Portions of the space and the sealing part and the space, which correspond to both corners of the side from which the anode lead and the cathode lead are projected, may respectively include trimming portions intended toward the electrode assembly.

A portion of the space and the sealing part between the anode lead and the cathode lead may include a trimming portion intended toward the electrode assembly.

The trimming portion may be spaced apart from the anode and cathode leads and the top end of the electrode assembly by a distance corresponding to the width of the sealing part.

The trimming portion may be formed in a parabola shape having a vertex corresponding to a point spaced apart from the top end of the electrode assembly by at least 3 mm.

The trimming portion may be formed in an inverted triangle having a vertex corresponding to a point spaced apart from the top end of the electrode assembly by at least 3 mm.

Portions of the space and the sealing part, which correspond to both corners of the side from which the anode and cathode leads are projected, and a portion of the space and the sealing part between the anode and cathode leads may respectively include trimming portions indented toward the electrode assembly.

The width of the sealing part including the trimming portion may be maintained.

At least one side of the upper case and at least one side of the lower case may be connected to each other The upper case and the lower case may be separated from each other and respectively have spaces accommodating the electrode assembly.

To achieve the above object, there is also provided a lithium secondary battery comprising the pouch type case and the electrode assembly.

The electrode assembly may include a trimming portion having the same shape as the trimming portion formed at the pouch type case at a portion corresponding to the trimming portion formed at the case.

The electrode assembly may correspond to one of a stack & folding electrode assembly manufactured in such a manner that a bi-cell and a full-cell are arranged on a long separating film in an intersecting manner and folded, a stack & folding electrode assembly manufactured in such a manner that only the bi-cell is placed on the separating film and folded, a stack & folding electrode assembly manufactured in such a manner that only the full-cell is placed on the separating film and folded, a Z-shaped stack & folding electrode assembly manufactured by folding the bi-cell or the full-cell using the separating film in a zigzag direction, a stack & folding electrode assembly manufactured by continuously folding the bi-cell or full-cell in the same direction, an electrode assembly manufactured in such a manner that an anode and a cathode are arranged on a long separating film in an intersecting manner and folded, a jelly-roll type electrode assembly manufactured by winding a positive plate, a separator and a negative plate, sequentially arranged, in one direction, and a stack-type electrode assembly.

Trimming portions may be previously formed at the upper case and the lower case of the pouch type case, and then the sealing part may be sealed through thermal bonding.

To achieve the above object, there is also provided a battery pack comprising the lithium secondary battery.

The battery pack may include a holder arranged on the trimming portions formed at the pouch type case of the lithium secondary battery.

The cross-sectional shape of the holder may correspond to the shape of the trimming portions formed at the pouch type case.

The battery pack may be used as a power supply of a medium-and-large-size device.

The medium-and-large-size device may correspond to a power tool, an electric vehicle such as a hybrid electric vehicle and a plug-in hybrid electric vehicle, an electric two-wheeled vehicle including E-bike and E-scooter, an electric golf cart, an electric truck, an electric commercial vehicle, or an electric power storage system.

The pouch type case according to the present invention can reduce the internal dead space to improve space utilization and fix a battery pack more stably when a battery pack structure requiring a holder is designed. That is, the stability and space utilization of the battery case can be maximized. Furthermore, the decrease in the internal dead space of the battery reduces a space where gas may remain in case emergency. In addition, the pouch type case has high internal pressure so as to rapidly ventilate gas and restrain generation of additional gas.

The accompanying drawings, which are included to provide a further understanding of the invention and are incorporated in and constitute a part of this specification, illustrate embodiments of the invention and together with the description serve to explain the principles of the invention.

DETAILED DESCRIPTION

Figure 1:
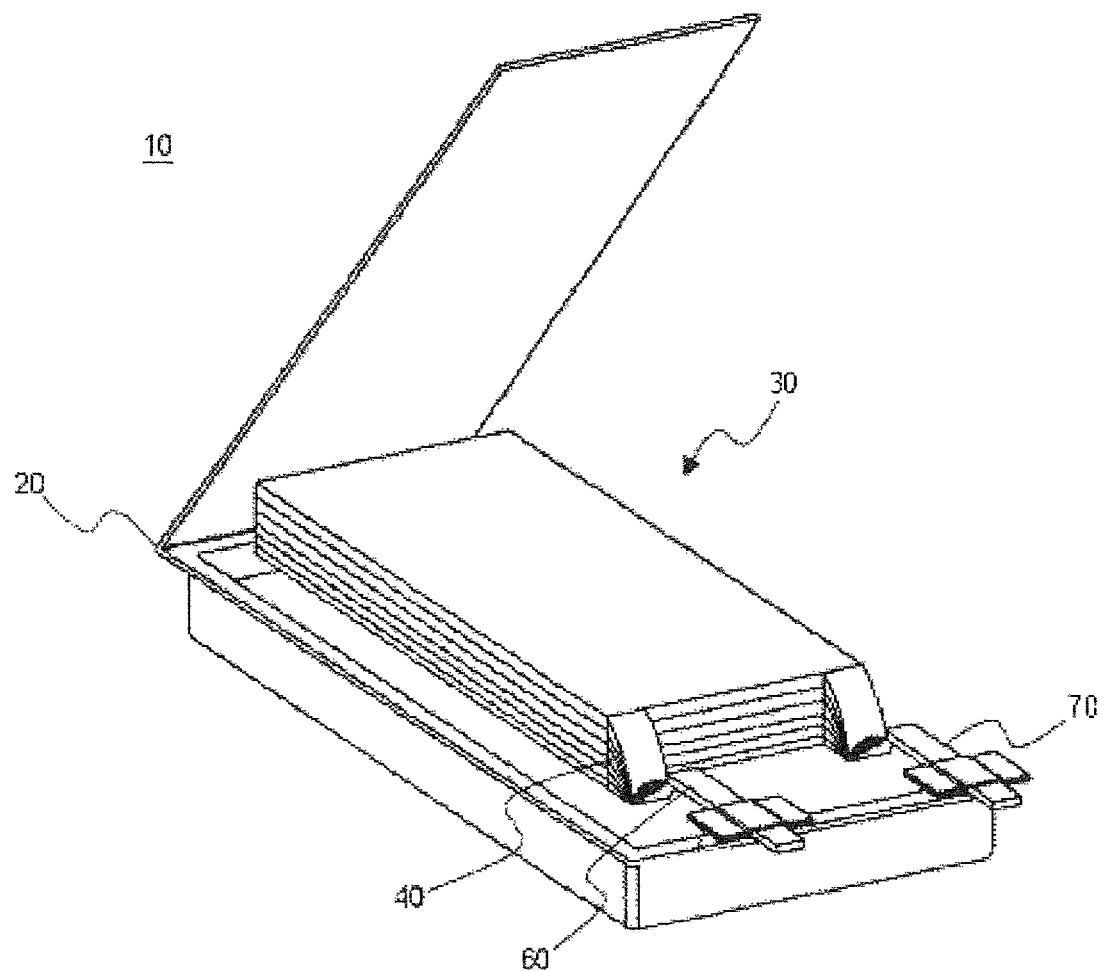
FIG. 1 is an exploded perspective view of a general structure of a conventional pouch type secondary battery.
Figure 2:
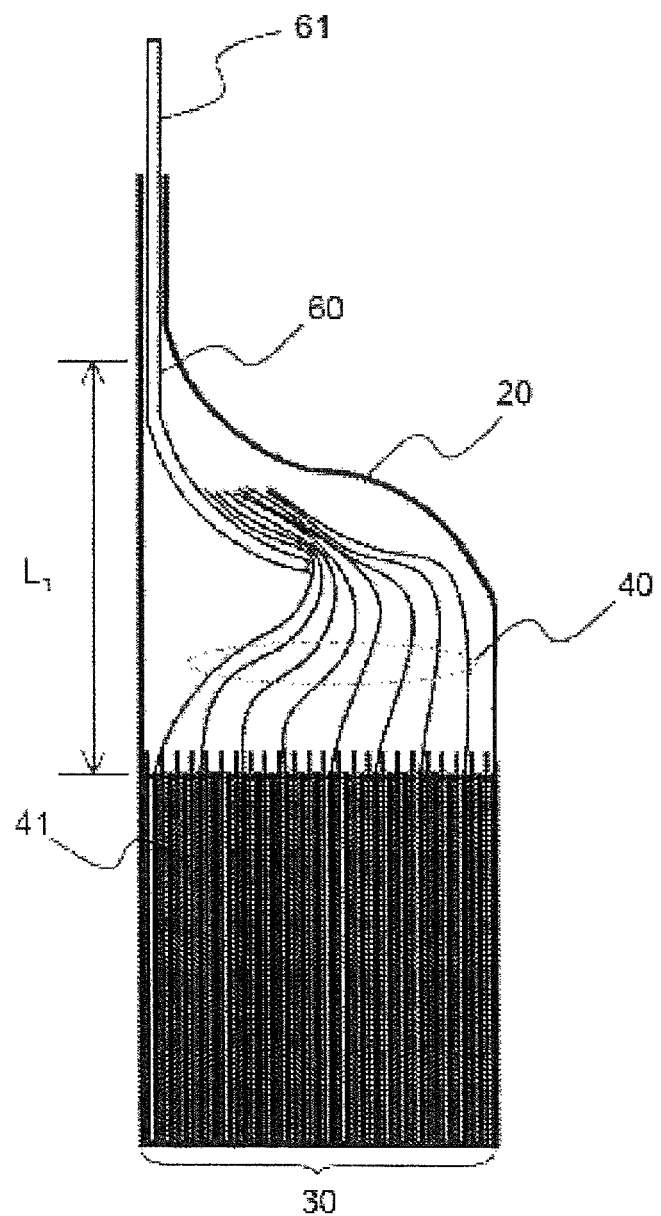
FIG. 2 is a partial enlarged view illustrating the top portion of the inside of a battery case of the secondary battery shown in FIG. 1, where cathode taps are combined in a concentrated manner and connected to a cathode lead.
Figure 3:
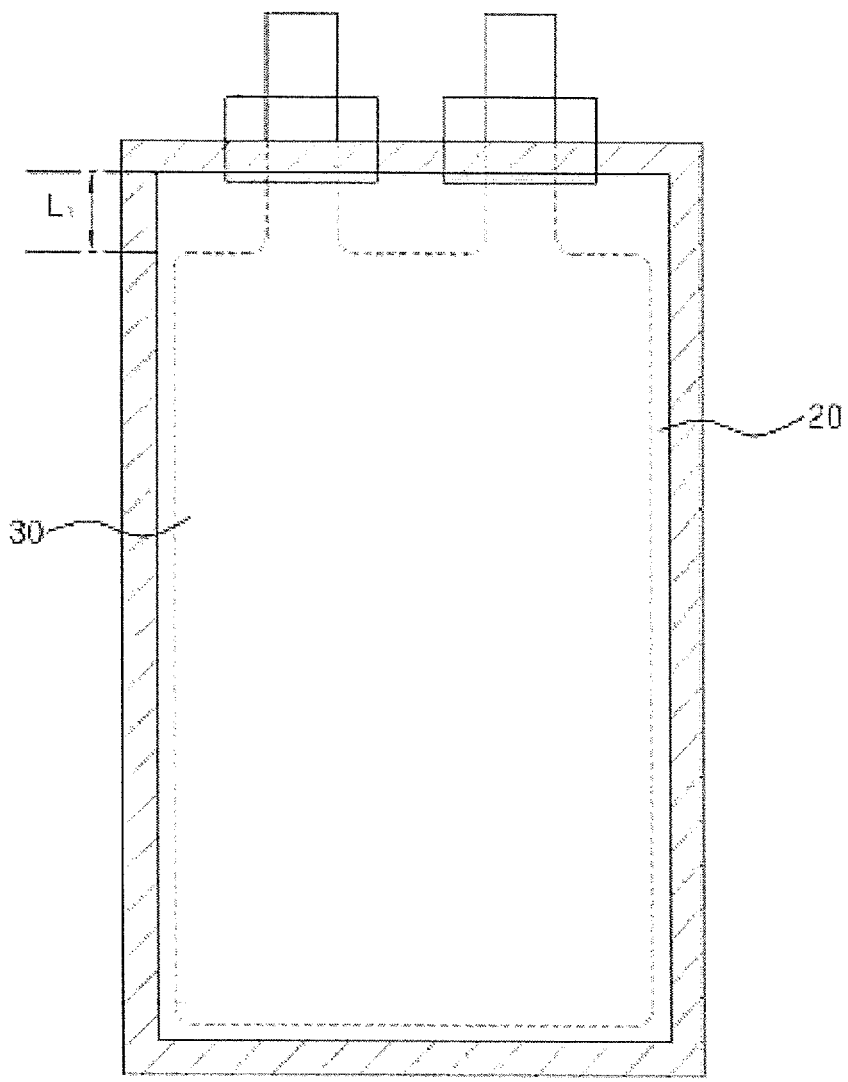
FIG. 3 is a plan view of the secondary battery shown in FIG. 1 when assembled.
Figure 4:
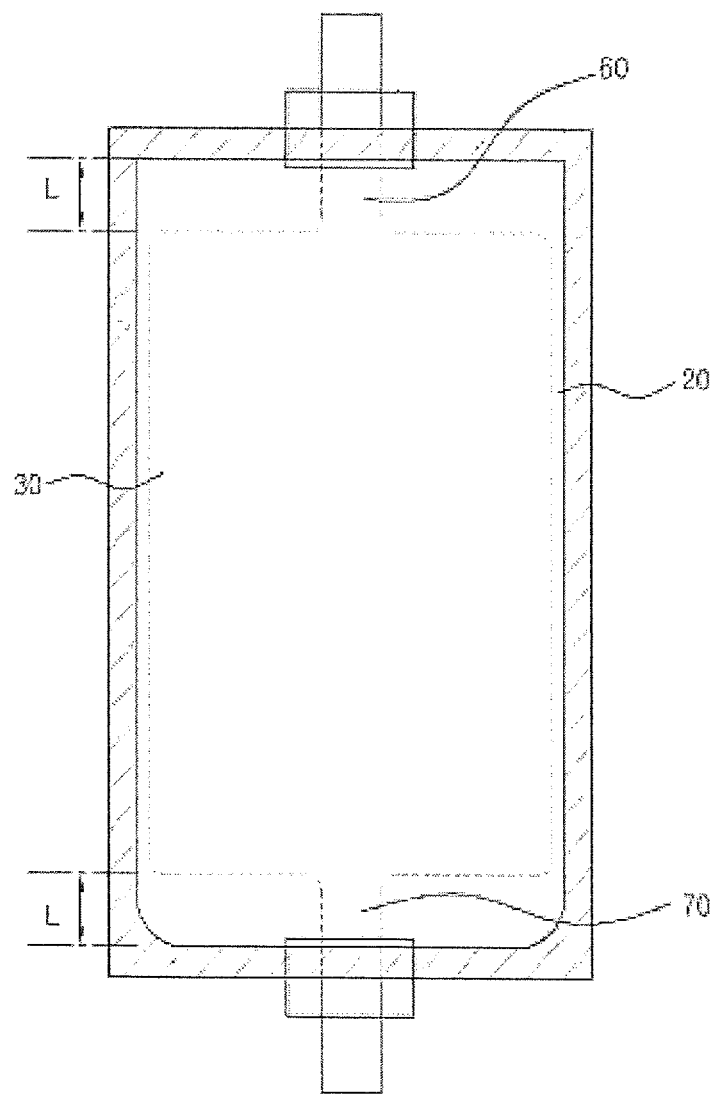
FIG. 4 is a plan view of a conventional pouch type secondary battery having electrode leads projected in two directions.
Figure 5:
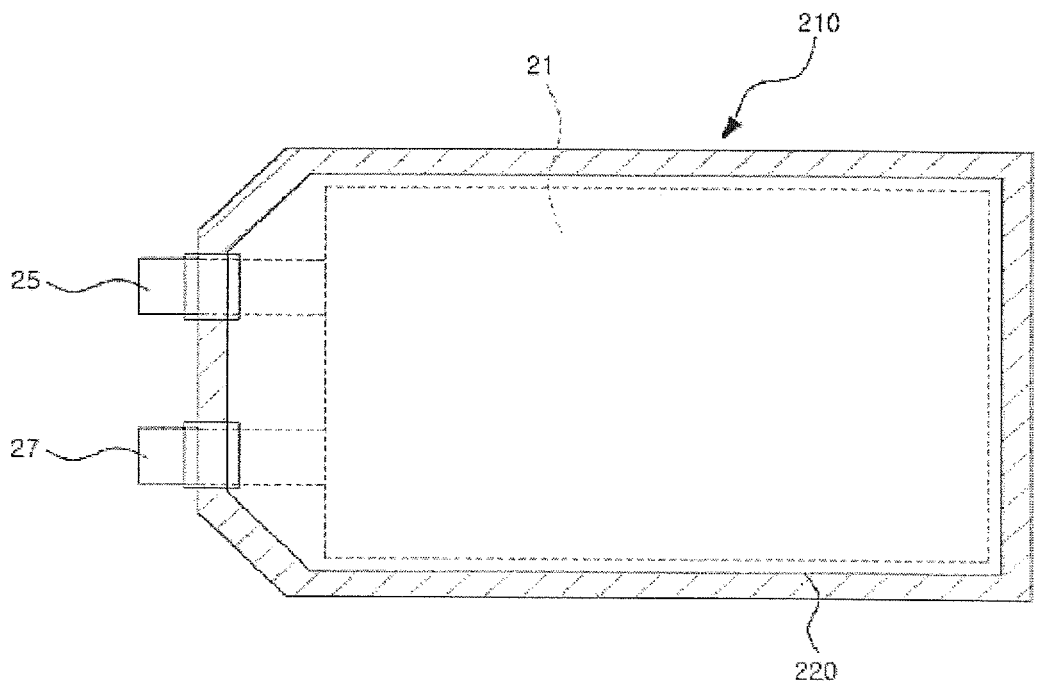
FIGS. 5 through 9 are plan views of secondary batteries having electrode leads projected in one direction according to embodiments of the present invention.
Figure 6:
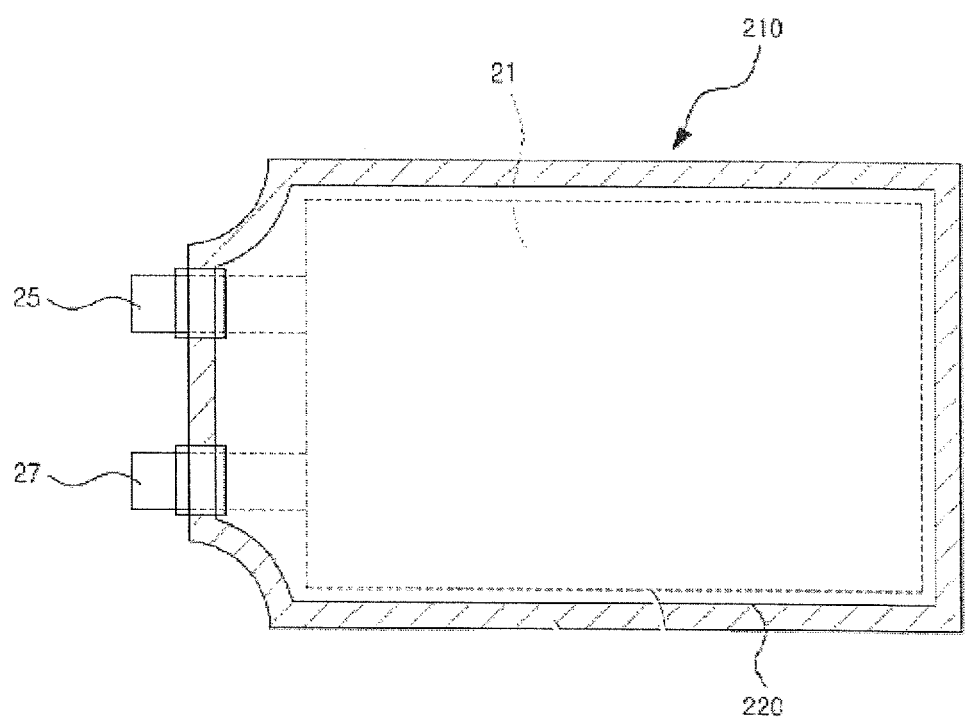

A pouch type case according to an embodiment of the present invention includes a space accommodating an electrode assembly composed of a positive plate, a negative plate and a separator interposed between the positive and negative plates and a sealing part sealing up an upper case and a lower case, in which a portion of the space and the sealing part, which corresponds to at least one of left and right sides of an electrode lead projected to the outside of the case, is trimmed to be indented toward the electrode assembly so as to minimize an internal dead space of a battery using the pouch type case.

As described above, the dead space in the electrode assembly is generated in a region where an electrode lead is formed in order to form a welded portion of electrode taps and the electrode lead.

Accordingly, to minimize the dead space, portions of the pouch type case according to the present invention other than a portion corresponding to a minimum region for forming the welded portion of the electrode lead and the electrode taps around the electrode lead are trimmed to be indented toward the electrode assembly.

The pouch type case having a minimized internal dead space according to the present invention has battery internal pressure higher than that of a conventional pouch type case having the same size, and thus the pouch type case according to the present invention can further restrain the generation of gas. In addition, when a battery pack is assembled using secondary batteries including the aforementioned pouch type case as unit cells, the battery pack can contain a larger number of cells for the pressure applied to the battery pack when assembled. Moreover, a holder can be inserted into trimming portions so as to improve stability.

The pouch type case according to the present invention may have electrode leads projected in different directions. Here, the electrode leads may be projected from a longer side as well as a shorter side of a unit battery cell.

When the pouch type case includes the above electrode assembly, a trimming portion can be formed at one of the left and right sides of each electrode lead and, desirably, trimming portions can be respectively formed at the left and right sides of each electrode lead. When the trimming portions are respectively formed at the left and right sides of each electrode lead, the internal dead space of the battery can be further minimized and generation of gas can be effectively restrained.

If the electrode assembly has a single anode lead and a single cathode lead, trimming portions are respectively formed on four corners of the pouch type battery case such that the trimming portions are intended toward the electrode assembly.

Furthermore, the pouch type case according to the present invention may have electrode leads projected in the same direction. Here, the electrode leads may be projected from a longer side as well as a shorter side of the unit battery cell.

In this case, trimming portions may be respectively formed on both corners of the sealing side from which the electrode leads are projected.

That is, in the case of the electrode assembly having a single anode lead and a single cathode lead projected in the same direction, the pouch type case may have trimming portions respectively formed on both corners of the side from which the electrode leads are projected.

The shape or size of the trimming portion is not limited and may depend on battery capacity or size. However, the trimming portion is required to be spaced apart from the electrode assembly inserted into the pouch to reduce dielectric breakdown, which depends on the battery size. In an embodiment of the present invention, the trimming portion may be spaced apart from the top end of the electrode assembly by at least 3 mm.

Furthermore, it is desirable to space the trimming portion from the electrode lead projected to the outside of the case by a distance corresponding to the width of the sealing part. The distance between the trimming portion and the electrode lead may depend on the battery size since the width of the sealing part depends on the battery size. In an embodiment of the present invention, the trimming portion is spaced apart from the electrode lead by at least 6 mm based on the sealing width (6 mm) of the pouch type case.

Although the upper limit of the spacing distance is not limited, the trimming portion may be spaced apart from the electrode lead by a distance in the range of 6 mm to the width of the electrode lead and spaced apart from the top end of the electrode assembly by a distance in the range of 3 mm to the vertical length of the electrode lead in an embodiment of the present invention.

If the trimming portion is indented by a distance exceeding the minimum spacing distance, it may be difficult to protect the electrode assembly and the electrode taps from external impact and a space in which electrolyte can remain is too small to cause the function of the battery to be affected.

If the trimming portion of the pouch type case according to the present invention is designed to be spaced apart from the electrode assembly and electrode lead by appropriate distances, as described above, the shape or size of the trimming portion is not limited and can depend on the battery capacity or size and the trimming portion can be formed in various shapes including circular, oval, rectangular and straight-line shapes.

In the case of the pouch type battery case having electrode leads projected in the same direction, a trimming portion may be formed, being intended toward the electrode assembly, at a portion of the space and the sealing part between the electrode leads so as to minimize the internal dead space of the battery.

The shape or size of the trimming portion formed between the electrode leads is not limited since it depends on the battery capacity or size. To protect the electrode assembly and electrode taps from external impacts and secure a space where electrolyte can remain, the trimming portion is required to be spaced apart from the electrode assembly inserted into the pouch by a predetermined distance so as to reduce dielectric breakdown, which depends on the battery size. The trimming portion may be spaced apart from the top end of the electrode assembly by at least 3 mm in an embodiment of the present invention. Furthermore, the trimming portion may be spaced apart from the electrode lead projected to the outside of the case by a distance corresponding to the width of the sealing part. Since the width of the sealing part may depend on the battery size, the distance between the trimming portion and the electrode lead may also depend on the battery size. In an embodiment of the present invention, the trimming portion may be formed such that the trimming portion is spaced apart from the electrode lead by at least 6 mm based on the sealing width (6 mm) of the pouch. If the trimming portion is indented by a distance exceeding the minimum spacing distance, it may be difficult to protect the electrode assembly and the electrode taps from external impacts and the function of the battery may be affected since a space where electrolyte is very small. Accordingly, in a preferred embodiment of the present invention, the trimming portion between the electrode leads may be formed in a parabola having a vertex corresponding to a point spaced apart from the top end of the electrode assembly by at least 3 mm. Otherwise, the trimming portion may be formed in a semicircle, an oval or an inverted triangle, The pouch type case may have an upper case and a lower case separated from each other or connected with each other through at least one side thereof.

Furthermore, the space accommodating the electrode assembly may be formed in one of the upper and lower cases or formed in both the upper and lower cases.

Figure 10:
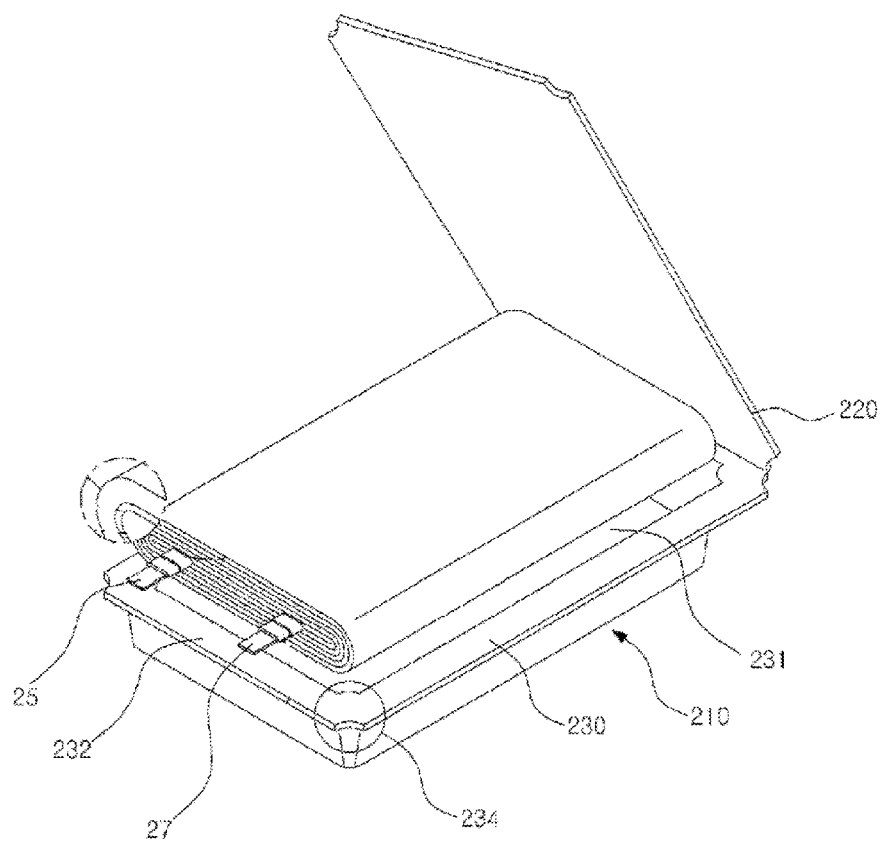
FIG. 10 is an exploded perspective view corresponding to the view of FIG. 6 and showing a pouch including upper and lower cases connected with each other through one side thereof and having three sealed sides.
Figure 11:
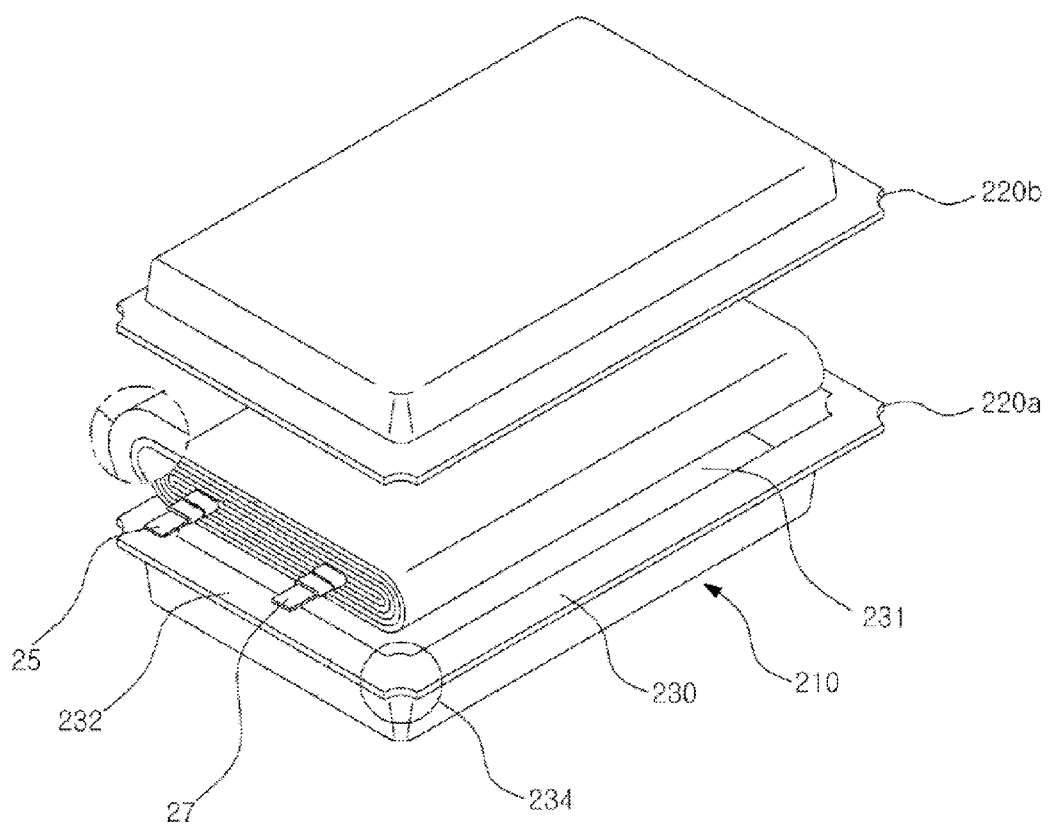
FIG. 11 is an exploded perspective view corresponding to the view of FIG. 6 and showing a pouch including upper and lower cases separated from each other and having four sealed sides.

FIG. 10 is an exploded perspective view of a pouch type case 220 including upper and lower cases connected with each other through one side thereof and having three sealed sides and FIG. 11 is an exploded perspective view of a pouch type case having an upper case 220*b* and a lower case 220*a* separated from each other and an electrode assembly accommodating space formed in both the upper and lower cases 220*b* and 220*a* (double cup structure). In the pouch type case shown in FIG. 11, all the four sides of the case are sealed.

A method of manufacturing the pouch type battery case according to the present invention is not limited and may use the conventional manufacturing method. Specifically, the above-described trimming portion is previously formed at the pouch type case such that the internal dead space of the battery using the pouch type case is minimized in consideration of the capacity, size and purpose of the battery, the electrode assembly is mounted in the space for accommodating the electrode assembly, and then the sealing part is sealed through thermal bonding to produce a unit battery cell.

The electrode assembly includes the positive plate, the negative plate and the separator interposed between the positive plate and the negative plate.

The positive plate includes a positive current collector formed from a strip-shaped sheet metal and a positive active material layer coated on at least one side of the positive current collector. The positive current collector may be an aluminum sheet having high conductivity and the positive active material layer is not limited and may be a composition of lithium oxide, binder, plasticizer, and conductive material. The cathode lead is attached to a non-coated portion of the positive plate.

The negative plate includes a negative current collector formed from a strip-shaped sheet metal and a negative active material layer coated on at least one side of the negative current collector.

The negative plate may be sheet copper having high conductivity and the negative active material layer may be a composition of a negative active material such as carbon, binder, plasticizer and conductive material. The anode lead is attached to a non-coated portion of the negative plate.

The anode lead and the cathode lead are electrically connected to the surfaces of positive and negative non-coated portions. To achieve this, the anode lead and the cathode lead are electrically bonded to the positive and negative non-coated portions through welding such as laser welding or ultrasonic welding or using a conductive adhesive.

The electrode assembly included in the pouch type case according to the present invention is not limited to a specific shape and may have various shapes. Examples of the electrode assembly can include a stack & folding electrode assembly constructed in such a manner that a bi-cell and a full-cell, stack-type unit cells of different types, are arranged in an intersecting manner and wound by a long separating film, a stack & folding electrode assembly including stack-type unit cells of the same types, a Z-shaped stack & folding electrode assembly having stack-type unit cells wound by a separating film and folded in a zigzag direction, a stack & folding electrode assembly having stack-type unit cells continuously wound in the same direction, an electrode assembly constructed in such a manner that an anode and a cathode are alternately arranged on a separating film and continuously wound, a Z-shaped electrode assembly constructed in such a manner that an anode and a cathode are alternately arranged on a separating film and wound in a zigzag direction, a general stack-type electrode assembly, and a jelly-roll type electrode assembly constructed in such a manner that a positive plate, a separator, and a negative plate are sequentially arranged and wound in one direction.

When the pouch type case accommodates a stack-type electrode assembly in an embodiment of the present invention, a negative pole plate, a positive pole plate and a separator of the stack-type electrode assembly may have trimming portions corresponding to the trimming portions of the pouch type case.

In the pouch type case according to the present invention, opposite faces of the upper and lower cases may be formed from a film having thermal adhesion and a plurality of films of other materials may be sequentially stacked and combined. Here, the film of the upper and lower cases may be composed of a polyolefin resin film having thermal adhesion and functioning as a sealing material, a base for maintaining the mechanical strength of the case, an aluminum film functioning as a barrier against moisture and oxygen, and a nylon film serving as a base and a protection layer.

The outer shape of the combined upper and lower cases maintains a rectangle to correspond to the outer shape of the battery such that the volume of the outer shape of the combined upper and lower cases can be minimized.

The upper and lower cases may be in contact with each other through at east one side thereof and other sides thereof may be open.

One of the upper and lower cases may have the space accommodating the electrode assembly and the sealing part is formed along the edge of the space. Furthermore, the space accommodating the electrode assembly may be formed in both the upper and lower cases.

The sealing part means a portion of the case, which is sealed through thermal bonding after the electrode assembly, is mounted in the space.

The electrode assembly having the above structure may be wound in one direction with the positive plate, the separator and the negative plate sequentially arranged, that is, in a jelly-roll-type structure.

The jelly-roll type electrode assembly manufactured as above has semiconductor polymer electrolyte formed on the separator made of a polymer with flexibility, for example, polyethylene, and thus the jelly-roll type assembly can operate as a lithium secondary battery without requiring additional electrolyte to be injected thereto to thereby minimize the internal dead space of the battery.

The jelly-roll type electrode assembly is mounted in the upper or lower case in which the space is prepared. Here, the ends of the anode lead and the cathode lead electrically connected to pole plates of the electrode assembly are projected to the outside of the sealed case.

After the electrode assembly is mounted in the space, predetermined heat and pressure are applied to the sealing part formed along the edge of the space to seal up the case. Here, the sealing part is integrated with the case and extended from the case along the edge of the space and maintains a predetermined width.

It is desirable to maintain the predetermined width of the sealing part in a portion of the sealing part, which has a trimming portion. The portion of the sealing part around an electrode lead may have a thicker width such that the portion around the electrode lead can be sealed more securely.

The present invention provides a battery pack including the pouch type cast having indented portions.

The battery pack is constructed in such a manner that unit cells including the pouch type case according to the present invention are arranged in a module case and packaged. When the battery pack is assembled, relatively high pressure is applied to the battery pack for applied specific pressure, and thus the unit cells become compact so that a larger number of unit cells can be packed in the module case having a specific area, thereby providing a large-capacity battery pack.

The unit cells may be sequentially stacked in the module case or connected in parallel in the module case.

The unit cells stacked or arranged in parallel in the module case must be securely fixed through a method such as bonding to be prevented from shaking or short-circuiting when the battery pack is used.

The battery pack according to the present invention arranges a holder on the trimming portions formed at the unit cells stacked or connected in parallel in the module cast to stably fix the unit cells in the module case, thereby maximizing the stability of the unit cells.

In this case, the shape and size of the holder may correspond to the shape and size of the trimming portions formed at the unit cells such that the holder can be mounted on the trimming portions of the unit cells more stably. The holder can securely fix the unit cells in the module case to remarkably improve the stability of the battery pack.

The battery pack according to the present invention can be used not only as a power supply of a small-size device but also as a medium-and-large-size device including a plurality of battery cells.

Examples of the medium-and-large-size device can include power tools, electric vehicles including a hybrid electric vehicle and a plug-in hybrid electric vehicle, two-wheeled vehicles including E-bike and E-scooter, electric golf carts, electric trucks, electric commercial vehicles and power storage systems. However, the medium-and-large-size device is not limited thereto.

The present invention will now be described more fully with reference to the accompanying drawings, in which exemplary embodiments of the invention are shown. The invention may, however, be embodied in many different forms and should not be construed as being limited to the embodiments set forth herein.

FIGS. 5 through 11 are plan views of a pouch type battery case 220 according to embodiments of the present invention, which has electrode leads projected in the same direction.

The pouch type battery case 220 may have a trimming portion 234 formed on at least one of the left and right sides of the electrode leads 25 and 27 and intended toward an electrode assembly 21 so as to minimize a dead space formed around the electrode leads 25 and 27.

Figure 7:
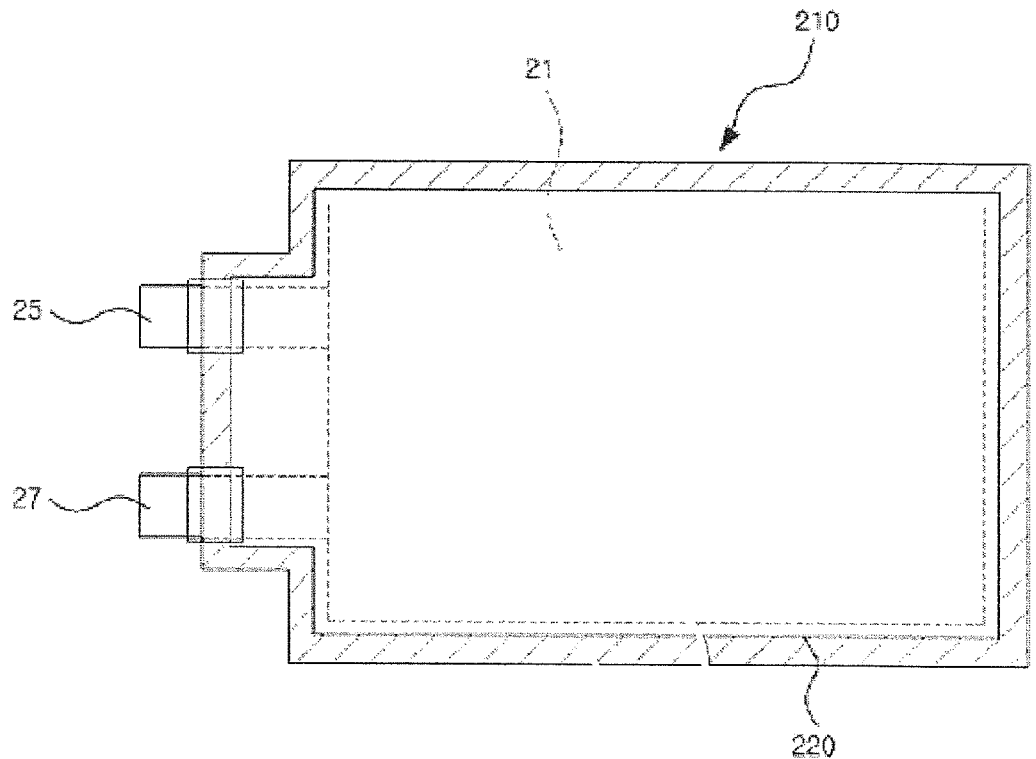

The size and shape of the trimming portion are not limited and the trimming portion can be formed in various shapes such as a straight-line shape (shown in FIG. 5), a curved shape (shown in FIG. 6) and a rectangular shape (shown in FIG. 7). However, it is desirable that the trimming portion is spaced apart from the top end of the electrode assembly 21 by at least 3 mm and spaced apart from the electrode leads 25 and 27 by at least the width of the sealing part in order to effectively protect the electrode leads 25 and 27 and the electrode assembly 21 from external impacts.

Figure 8:
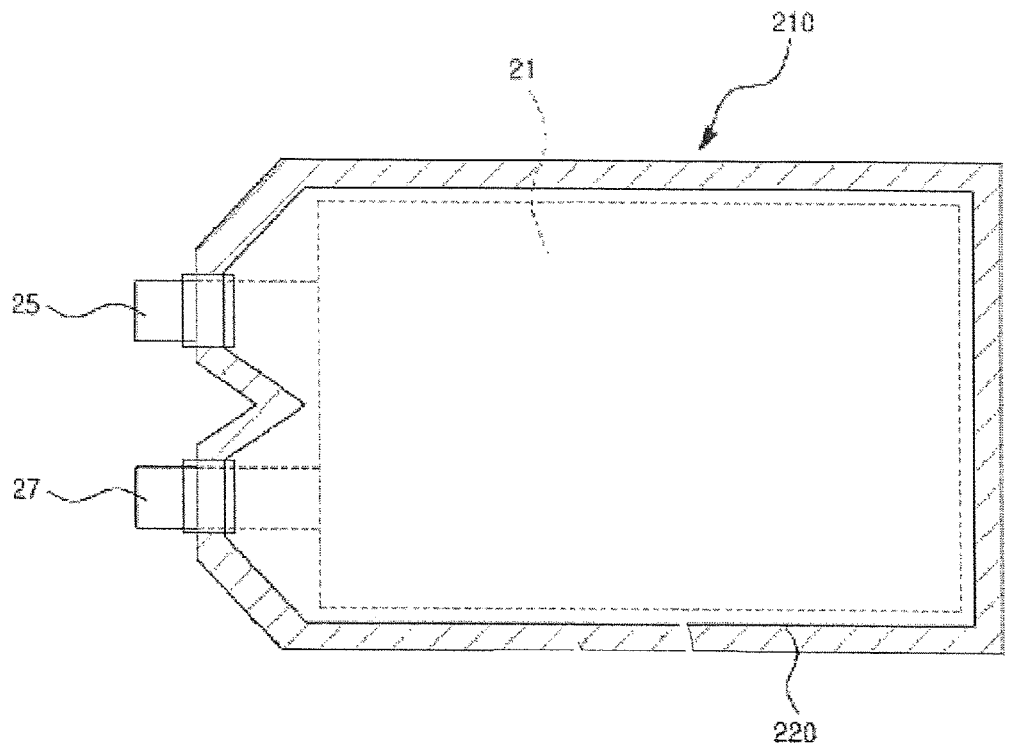
Figure 9:
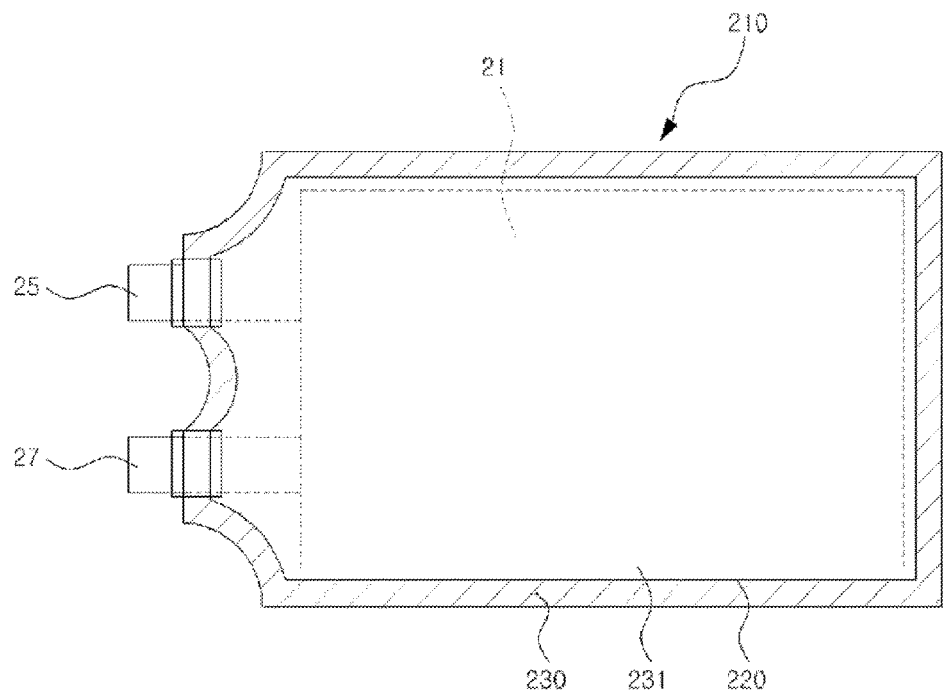

Referring to FIGS. 8 and 9, a trimming portion may be formed between the electrode leads 25 and 27 projected in parallel. The shape of the trimming portion is not limited as long as the aforementioned minimum spacing distances are maintained. While the trimming portion has a curved shape or V shape in the embodiments shown in FIGS. 8 and 9, the shape of the trimming portion is not limited thereto.

Figure 12:
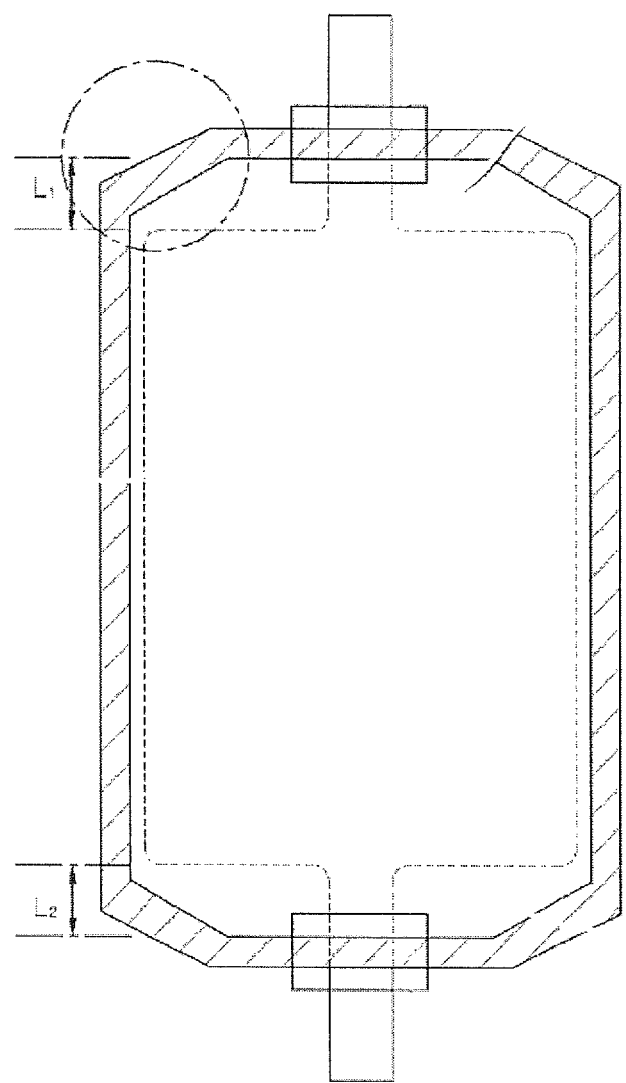
FIGS. 12 and 13 are plan views of secondary batteries having electrode leads projected in two directions according to embodiments of the present invention.
Figure 13:
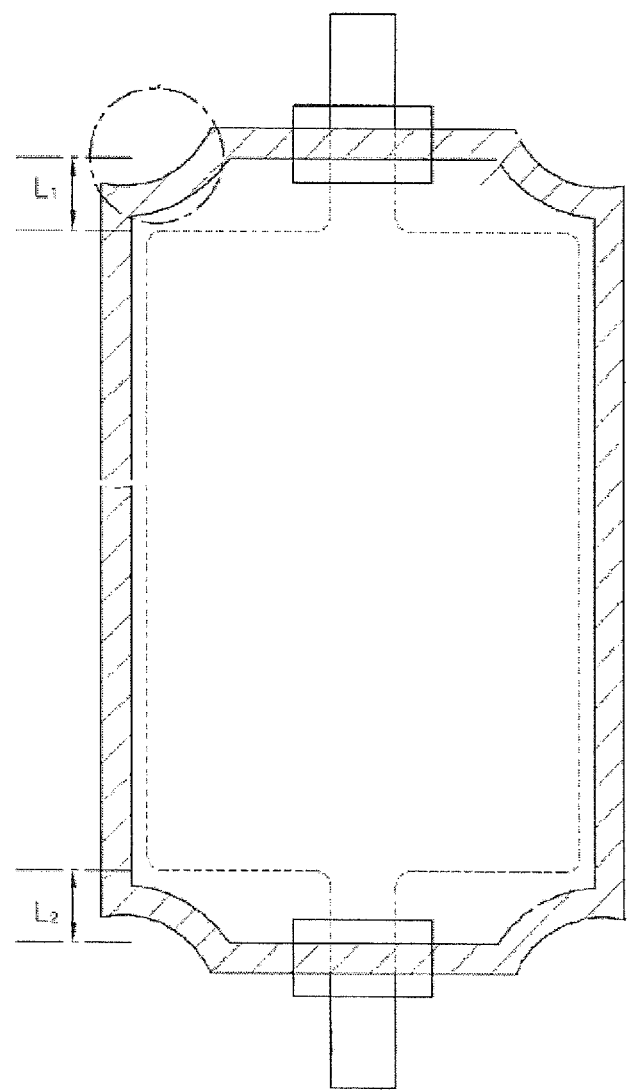

When the electrode leads are projected in two directions, it is desirable to respectively form trimming portions on the four corners of the pouch type battery case, as shown in FIGS. 12 and 13. However, the present invention is not limited to the embodiments shown in FIGS. 12 and 13.

Figure 14:
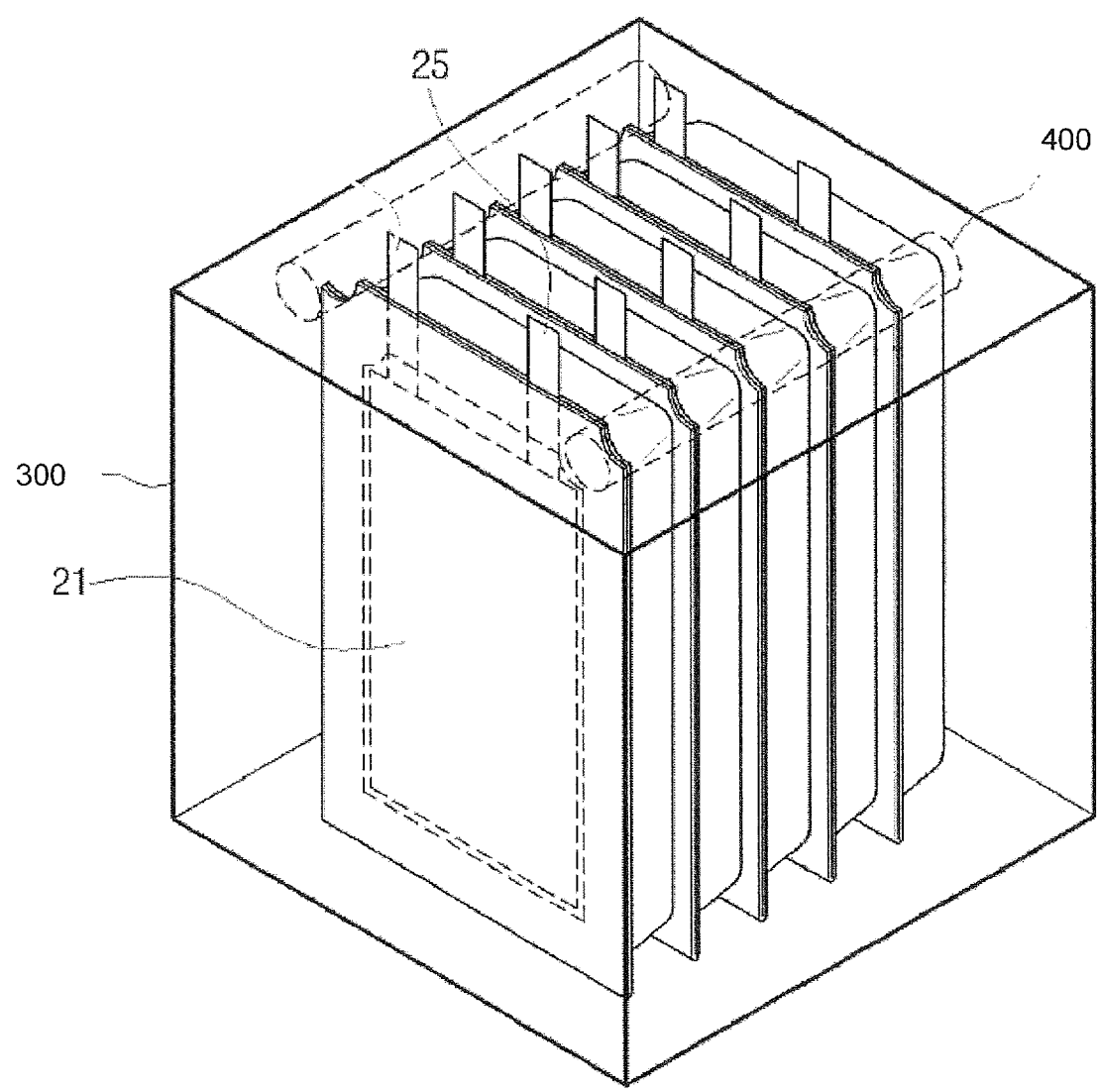
FIGS. 14, 15 and 16 are perspective views of battery packs including the pouch type case according to the present invention and a holder.
Figure 15:
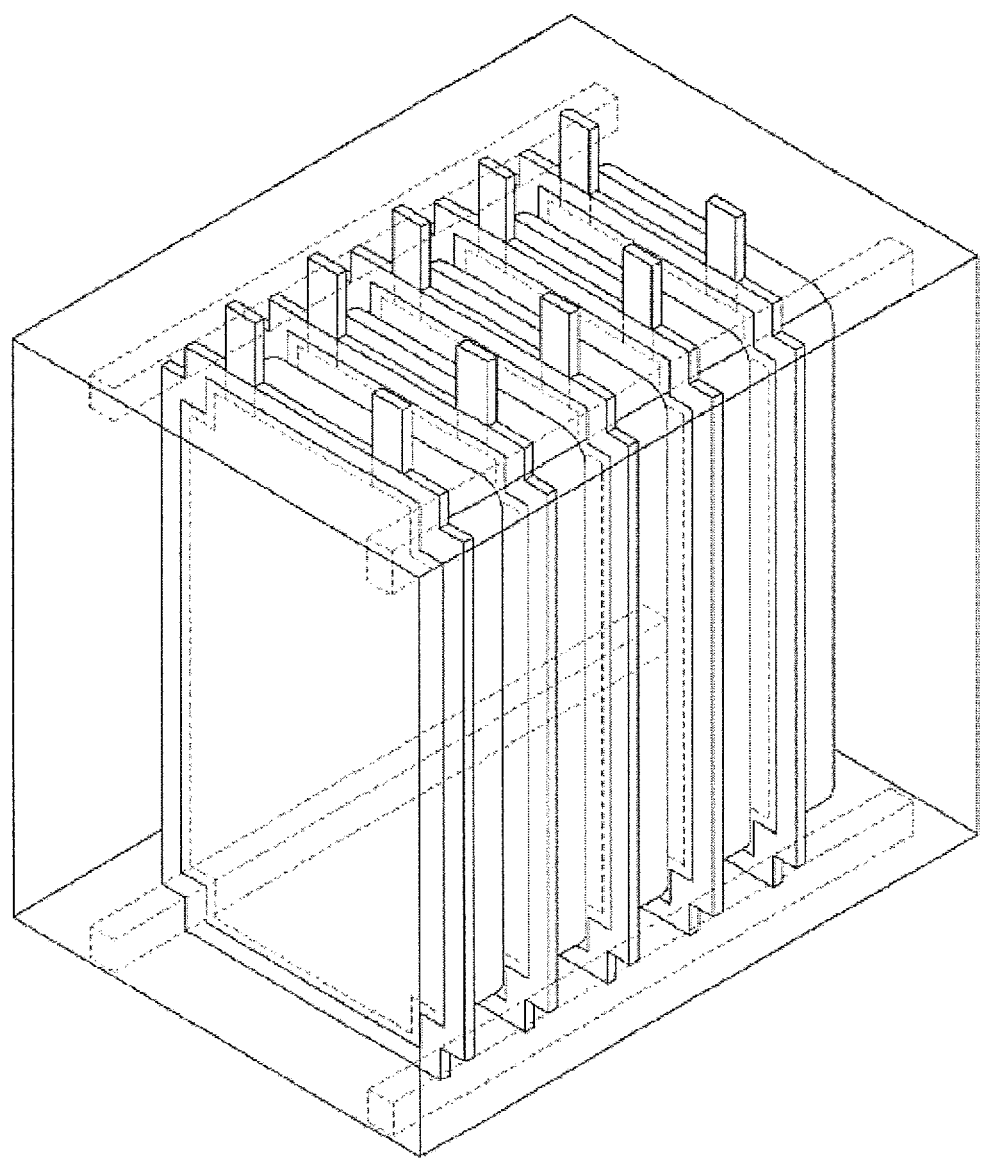
Figure 16:
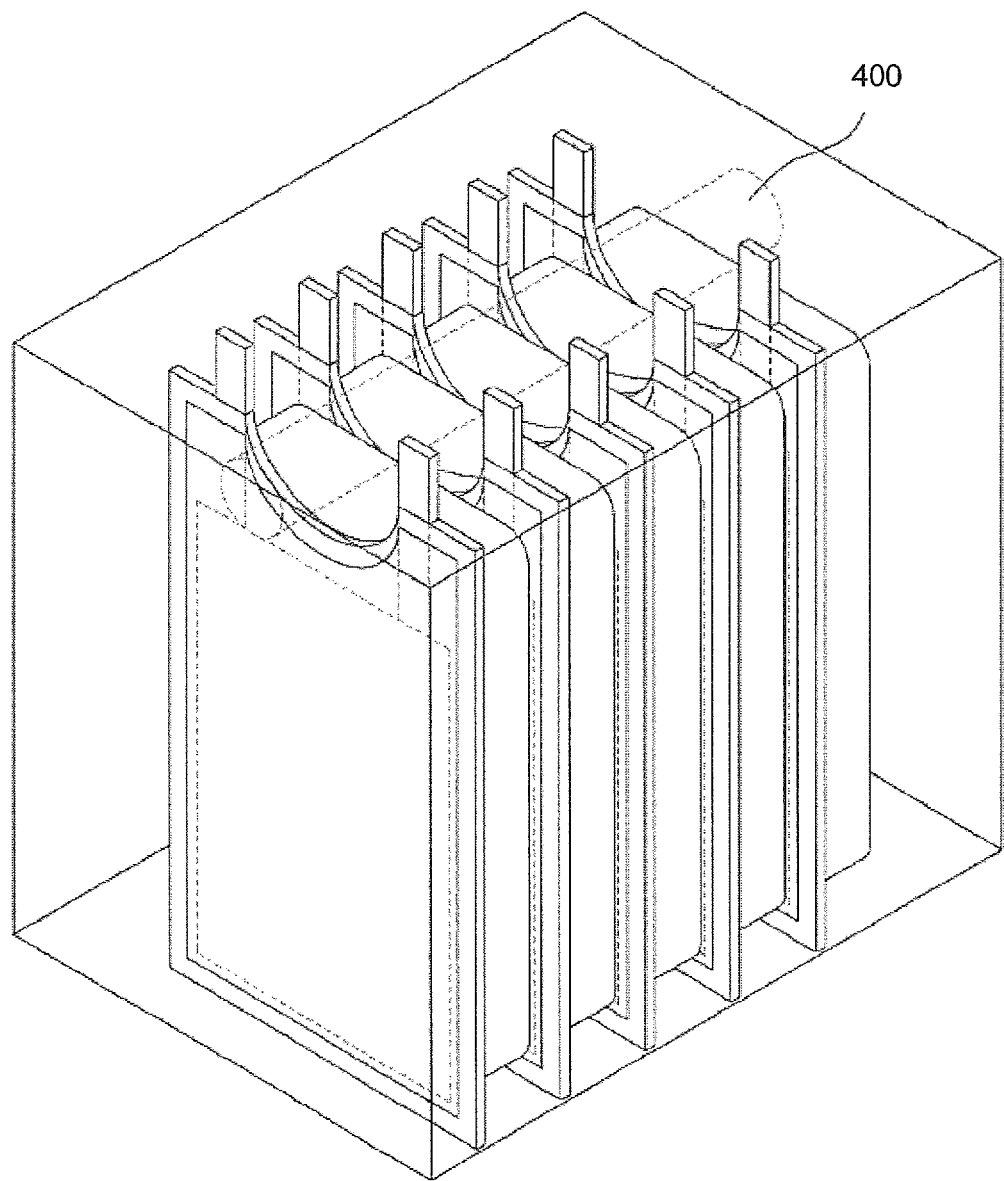

FIGS. 14, 15 and 16 are perspective views of battery packs having unit battery cells 210 including the pouch type battery case 220 according to the present invention. Each battery pack may include a holder 400 having a cross-sectional shape corresponding to the shape of trimming portion formed at the pouch type battery case included therein. The holder 400 may be arranged in a module case 300.

The shape and number of the holders 400 may depend on the positions of the trimming portions formed at the pouch type battery case and are not limited to the above embodiments.

While the present invention has been particularly shown in and described with reference to exemplary embodiments thereof, it will be understood by those of ordinary skill in the art that various changes in form and details may be made therein without departing the spirit and scope of the present invention as defined by the following claims.

What is claimed is:

1. A battery pack comprising a plurality of secondary batteries and a plurality of holders, each secondary battery comprising:
   a rectangular electrode assembly having four corners and including a first electrode lead projecting in a first direction and a second electrode lead projecting opposite the first direction, the electrode assembly extending in the first direction and a second direction perpendicular to the first direction; and a pouch type case comprising a sealing part having an outer perimeter and an inner perimeter for sealing an upper case and a lower case, and a space for accommodating the electrode assembly, the sealing part having four edges including two short edges and two long edges, the two long edges being longer than the two short edges, the two long edges being perpendicular to the two short edges and defining a pair of diagonals;

wherein a portion of the space, the inner perimeter and the outer perimeter of the sealing part include trimming portions indented toward the electrode assembly, ones of the trimming portions being respectively disposed adjacent each of the four corners of the electrode assembly at a junction of one of the short edges, and one of the long edges on one of the pair of diagonals, and wherein the plurality of secondary batteries are stacked on each other in a third direction perpendicular to each of the first and second directions, each holder extending in the third direction and engaged in a respective indentation in the outer perimeter of the sealing part of each of the secondary batteries at one of the trimming portions, each holder having a cross-sectional shape corresponding to a shape of the indentation.

2. The battery pack of claim 1, wherein the trimming portions have one of circular, oval, straight-line, rectangular, triangular, parabola and V shapes.

3. The battery pack of claim 1, wherein the trimming portions include trimming portions of the same shape.

4. The battery pack of claim 1, wherein at least one side of the upper case and at least one side of the lower case are connected to each other.

5. The battery pack of claim 1, wherein the upper case and the lower case are separated from each other and respectively have spaces accommodating the electrode assembly.

6. The battery pack of claim 1, wherein the secondary battery is a lithium secondary battery.

7. The battery pack of claim 6, wherein the battery pack is configured and arranged to supply power to an electric vehicle.

8. The battery pack of claim 7, wherein the electric vehicle is a hybrid electric vehicle.

9. The battery pack of claim 7, wherein the electric vehicle is an electric golf cart.

10. The battery pack of claim 7, wherein the electric vehicle is an electric truck.

11. The battery pack of claim 1, wherein the trimming portions are spaced apart from one of the electrode leads and a top end of the electrode assembly by a distance equal to a width of the sealing part.

12. The battery pack of claim 1, wherein a distance between the inner perimeter and the outer perimeter of the sealing part is constant.

13. The battery pack of claim 1, wherein the sealing part includes an inner surface disposed toward the electrode assembly, and an outer surface disposed away from the electrode assembly, the inner surface and the outer surface being indented toward the electrode assembly.

14. The battery pack of claim 1, wherein the inner perimeter and the outer perimeter of the sealing part include congruous corners.

* * * * *